March 10, 1970     D. E. CORNELL III, ET AL     3,499,235

DEVICE FOR EDUCATIONAL PURPOSES

Filed Oct. 10, 1966

INVENTORS
DUDLEY E. CORNELL III
JAMES L. EVANS

BY Alberts, Brezina & Lund

ATTORNEYS

United States Patent Office 3,499,235
Patented Mar. 10, 1970

3,499,235
DEVICE FOR EDUCATIONAL PURPOSES
Dudley E. Cornell III, and James L. Evans, both of 225 San Pedro NE., Albuquerque, N. Mex. 87108
Filed Oct. 10, 1966, Ser. No. 585,504
Int. Cl. G07b 3/06
U.S. Cl. 35—9                                                2 Claims

ABSTRACT OF THE DISCLOSURE

Device for educational purposes in which a transparent separator has adhesive means on one surface for securing the same to a surface of a card having indicia printed thereon, the opposite surface of the separator having removable opaque material thereon, preferably of an electrically conductive material. Preferably, the separator is in the form of a tape supplied in a roll.

---

This invention relates to a device for educational purposes, such as for testing, teaching and similar purposes, which is highly effective and efficient while being readily and economically manufacturable. The device of this invention is readily usable with automatic equipment, with a high degree of accuracy and with the possibility of error being substantially obviated.

Educational devices have heretofore been provided wherein multiple choice answers to a set of test questions are coded with the code designations being arranged on a separate answer sheet along with a covered designation as to whether the answer is correct or not, which coded designation is uncovered when the answer is chosen by the person taking the test and exposed to his view, to inform him immediately whether or not he has made the correct choice of answers.

Although such previously constructed devices are useful for some purposes, it has been found that they have disadvantages in that the material which covers the designations of the answers is not readily and completely removable, and in the process of attempting to remove the material the covered designations are at times marred or otherwise damaged. The difficulty in completely removing the material presents particular problems when the device is to be automatically graded by a machine and the possibility of damage to the covered designations produces errors in checking and in grading, and greatly diminishes the usefulness of the devices.

The present invention was designed to overcome such disadvantages of prior devices and to provide an educational device which combines the teaching and the testing processes in a more efficient manner while allowing for the easy and economical use of automation equipment.

An important feature of the present invention relates to the provision of an educational device wherein a covering means may be located over indicia on a supporting means in such a manner as to be easily removable in portions without damage to the indicia or the underlying support means.

A further important feature of the present invention relates to the provision of a covering means which is completely and easily removable in portions to selectively expose the concealed indicia on the support means, without traces of the covering means.

Another important feature of the invention relates to the provision of an educational device which is readily and easily usable with automation equipment in combining the teaching and testing processes.

A specific feature of the invention relates to the provision of an educational device for combining the teaching and testing processes which can be manufactured in large, compact quantities and applied at a later time to associated support means having indicia thereon, in an easy and efficient manner.

Another specific feature of the invention relates to the provision of a transparent separator which is preferably a transparent tape or other barrier on which the covering means for concealing indicia is located, which separator or barrier is impervious to the covering means and highly protective to the indicia and the support means on which they are located.

This invention contemplates other and more specific objects, features and advantages which will become more fully apparent from the following detailed description taken in conjunction with the accompanying drawings which illustrate preferred embodiments and in which.

Figure 1:
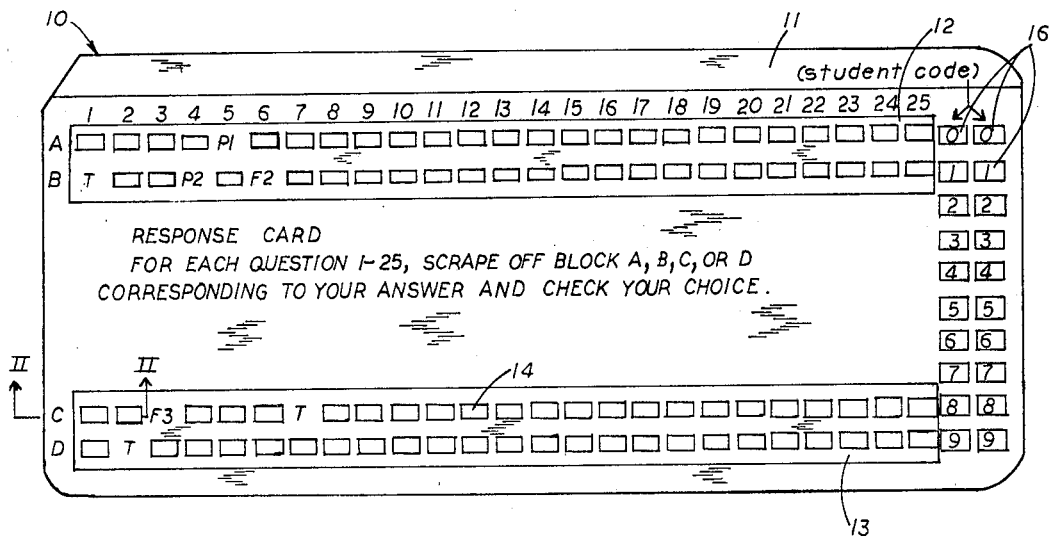
FIGURE 1 is a top plan view of a device for educational purposes, constructed according to the principles of this invention.

Reference numeral 10 generally designates a device for educational purposes, constructed according to the principles of this invention. The device 10 comprises a card 11 which is preferably of a size and type usable in automatic data processing equipment. The card 11 serves as a support means for two strips 12 and 13 of a transparent barrier tape which is adhesively secured to the top surface of the card 11. Covering means are provided on each of the strips 12 and 13 in the form of a plurality of separate blocks 14 of a concealing material, which serves to conceal indicia on separate areas of the upper surfaces of the card 11. The blocks 14 are preferably arranged in two horizontally extending rows on each of the illustrated strips 12 and 13, with the blocks also being arranged in vertical columns. In the illustrated arrangement, 25 vertical columns are provided, located under numerals from "1" through "25" which correspond to a series of 25 questions on an accompanying set of question material. Letters "A," "B," "C," and "D" are located on the card in horizontal alignment with the horizontal rows of blocks.

In using the card, the student selects one of four possible answers to a given question, and then removes one of the four blocks under the question number, corresponding to the selected answer. If the student has selected the correct answer, the letter "T," or other indicia indicative of the correct answer and imprinted on the upper surface of the card 11, will be exposed to view. If the student has not selected the correct answer, either no indicia will appear, or the letter "F" or a similar type of incorrect-answer indication may appear. The indicia exposed when the incorrect block is removed, may also indicate to the student an identification of explanatory material to which he may refer to explain why his answer was incorrect. The immediate indication of an incorrect answer, and the possibility of explaining why the answer is incorrect, is very important to the educational process.

By way of example, the indicial designations may be T; F1, F2, F3, F4, P1, P2, P3 and P4. T indicates that the answer associated with it is the correct answer to the accompanying question. F1 (F for false) indicates that the answer associated with it is incorrect, and that the student should refer to a statement associated with that question and labeled F1 to see why the answer chosen is incorrect. F2, F3, and F4 also indicate that the answers associated therewith are incorrect, and refer the student to statements F2, F3, and F4 explaining the reasons for this. P1, P2, P3, and P4 indicate that the answers associated therewith are partially correct, and refer the student to statements explaining these conclusions. In this way the student knows immediately upon scraping off a block 15 whether the answer he has chosen is correct, incorrect, or partially correct, and is referred to reasons for these conclusions. In FIGURE 1, questions 1–7 have been read and answers thereto have been chosen. The first two answers chosen, in locations "B" and "D," are correct. The answer to the third question, in location "C," is incorrect. The answers to the fourth and fifth questions, in locations "B" and "A," are partially correct. The sixth answer, in location "B," is incorrect, and the seventh answer in location "C" is correct. The student is thus able to learn as he answers the questions associated with the device 10 in a manner which has proven to be highly effective. Also, a permanent record of his work is made which may be used to evaluate his progress. Further, the detailed records of the student's progress through the material can be analyzed immediately to produce such records as are necessary to provide information for revision of the instructional system itself.

It is noted that suitable explanatory material may be disposed on the upper surface of the card 11, preferably between the strips 12 and 13 as illustrated, and additional indicia may be disposed on the card for identification of the student.

In the illustrated embodiment, rectangles 16 are arranged in two vertical columns with ten rectangles in each column, numbered "0" through "9," to be marked or punched to identify the student.

After the student has answered all of the questions, the card 11 may be run through automatic processing equipment, to automatically obtain an indication and record of the number of questions which have been correctly answered.

Figure 2:
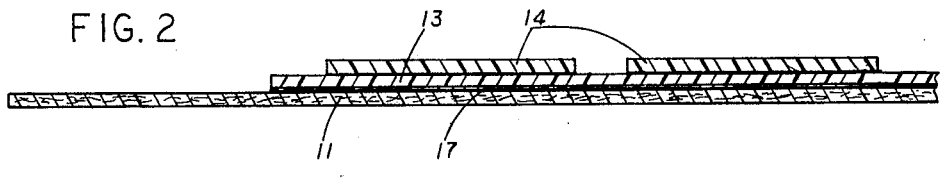
FIGURE 2 is a cross sectional view, on a greatly enlarged scale, taken substantially along line II—II of FIGURE 1.

FIGURE 2 is a sectional view on a greatly enlarged scale showing a small section of the card 11 with a portion of the strip 13 which carries two of the blocks 14 thereon. The card 11 is preferably a paper card of the type useable with data processing equipment and on which indicia may be readily provided by conventional printing processes.

The strip 13 is preferably a Mylar tape, of a polyethylene terephthalate resin, which is highly desirable in providing a thin tough resilient barrier on which the blocks 14 are disposed and from which the blocks 14 can be readily removed. The strip 13 is adhesively secured to the card 11 by means of an adhesive layer 17 which is preferably provided on the underside of the strip 13 prior to placement of the strip 13 on the card 11. The strip 12 is preferably of the same material as the strip 13 and is secured to the card 11 in the same way.

The covering blocks 14 are preferably applied to the strips 12 and 13 in the form of a paint which will dry to adhere to the strips 12 and 13, although they can be of a sheet material secured to the strips by a suitable adhesive and sufficiently thin to insure that they will be torn when removed, and not replaceable on the strips 12 and 13. In addition, the covering blocks 14 preferably have electrical properties different from the electrical properties of the strips 12 and 13 to facilitate detection of the presence thereof on the tape. For example, the covering blocks might contain particles of a magnetic material, or they may contain an electrically conductive material with the strips 12 and 13 being of an insulating material.

As one preferred example, the blocks 14 are applied to the strips 12 and 13 in the form of a liquid suspension of a conductive silver composition in a butyl Cellosolve acetate carrier, in a thermosetting resin. When dry, such blocks 14 form opaque conductive coatings which adhere to the surfaces of the strips 12 and 13 and may be readily scraped therefrom to leave the strips 12 and 13 unaffected thereby. Any flat relatively sharp object may be used to scrape the blocks 14 from the surfaces of the strips 12 and 13. A granular solid opaque extender such as carbon black may be added to the suspension.

Figure 3:
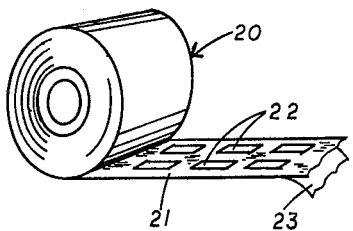
FIGURE 3 is a perspective view illustrating a roll of a tape embodying the principles of the invention.

Referring to FIGURE 3, a roll 20 of transparent tape 21 is shown partially unwound to show blocks 22 thereon. The tape 21 may be cut into strips of the required length to be adhesively secured to a card such as the card 11 and to provide strips such as the strips 12 and 13. A layer 23 of protective material is disposed under the tape 21 to prevent the underside from adhering to the upper surface and covering blocks 22 when the tape 21 is wound in the roll 20. The roll 20 may be unwound as it is needed, the protective layer 23 may be stripped off, and the tape 21 may be adhesively affixed to a support means, such as the card 11 in FIGURE 1. In this way, the tape 21 may be obtained and stored in a form which is compact and easy to handle, and it may be applied as needed to support means having indicia thereon representing the correct answers to test questions which have been devised.

With the tape arrangement, the cards can be readily printed with the desired indicia and the tape can be applied separately at any time prior to use. It is not necessary to attempt to apply removable concealing material to the card by a printing process or the like.

It will be understood that modifications and variations may be effected without departing from the spirit and scope of the novel concepts of this invention.

We claim as our invention:

1. In a device for educational purposes, a card having multiple choice answer-representing indicia imprinted thereon and arranged in a plurality of rows and a plurality of columns with equal spacing from one column to another, each column having a plurality of indicia respectfully disposed in said rows and indicating correct and incorrect answers to a question, a length of tape of a thin, tough, resilient, flexible, transparent and electrically insulating material having adhesive means on one surface thereof and covering means on the other surface thereof of an opaque electrically conductive material, said covering means being in the form of a plurality of rows and columns of blocks with a uniform lengthwise spacing between the columns and said blocks equal to the spacing between columns of said indicia on said card, said length of tape being secured by said adhesive means to said card to align said blocks with and to cover all of the answer-representing indicia of a plurality of said rows of indicia, said blocks being individually removable by scraping the same from said other surface of said tape to expose said indicia and to indicate the correctness of a response to the question associated therewith.

2. In a device as defined in claim 1, said tape being a film of a polyethylene terephthalate resin and said covering means being formed by particles of a conductive material in a suspension including a thermosetting resin and a butyl Cellosolve acetate carrier.

References Cited

UNITED STATES PATENTS

| | | | |
|---|---|---|---|
| 2,961,777 | 11/1960 | Neville et al. | 35—9 |
| 3,001,886 | 9/1961 | Shrewsbury et al. | 283—6 X |
| 3,055,117 | 9/1962 | Bernstein et al. | 35—48 |
| 3,106,032 | 10/1963 | Morgan | 283—6 |
| 3,300,879 | 1/1967 | Coppeta | 35—48 |

EUGENE R. CAPOZIO, Primary Examiner

W. W. NIELSEN, Assistant Examiner

U.S. Cl. X.R.

35—48